United States Patent [19]

Ushirono et al.

[11] Patent Number: 5,669,341
[45] Date of Patent: Sep. 23, 1997

[54] VALVE OPERATING SYSTEM FOR INTERNAL COMBUSTION ENGINE

[75] Inventors: Akihito Ushirono; Takashi Sugai; Takahiro Okuyama, all of Saitama, Japan

[73] Assignee: Honda Giken Kogyo Kabushiki Kaisha, Tokyo, Japan

[21] Appl. No.: 509,950

[22] Filed: Aug. 1, 1995

[51] Int. Cl.⁶ .................. F01L 9/04; F02B 31/00
[52] U.S. Cl. .................. 123/90.11; 123/90.15; 123/308; 123/432; 123/315
[58] Field of Search ............ 123/90.11, 90.16, 123/308, 315, 432, 90.15

[56] References Cited

U.S. PATENT DOCUMENTS

| | | | |
|---|---|---|---|
| 5,074,259 | 12/1991 | Pusic | 123/90.11 |
| 5,129,369 | 7/1992 | Kawamura | 123/90.11 |
| 5,222,714 | 6/1993 | Morinigo et al. | 123/90.11 |
| 5,269,270 | 12/1993 | Suzuki et al. | 123/90.16 |
| 5,495,832 | 3/1996 | Fujii et al. | 123/90.16 |
| 5,515,820 | 5/1996 | Sugimoto et al. | 123/90.16 |

*Primary Examiner*—Weilon Lo
*Attorney, Agent, or Firm*—Lyon & Lyon LLP

[57] ABSTRACT

In a valve operating system designed to open and close intake valves of an internal combustion engine by an electromagnetic force, a first electromagnetic driving device for electromagnetically driving a first intake valve capable of opening and closing a first intake valve bore and a second electromagnetic driving device for electromagnetically driving a second intake valve capable of opening and closing a second intake valve bore are controlled by a control device in a manner so that when the engine is in a predetermined operational state, the first intake valve is opened and closed in a condition in which the second intake valve has been closed and stopped. Thus, it is possible to produce a swirl equivalent to that produced by changing of the lift amount, to provide a reduction in consumed electric power and to achieve a reliable engine operation, e.g., starting.

10 Claims, 4 Drawing Sheets

VALVE OPERATING SYSTEM FOR INTERNAL COMBUSTION ENGINE

BACKGROUND OF THE INVENTION

1. Field of the Invention

The present invention relates to a valve operating system for an internal combustion engine and particularly, to a valve operating system for an internal combustion engine, which is designed to open and close an intake valve by an electromagnetic force.

2. Description of the Prior Art

The valve operating system designed to open and close the intake valve by the electromagnetic force is already known, for example, from U.S. Pat. Nos. 3,882,833 and 5,131,624 and the like.

It is known that when the internal combustion engine is, for example, started or in operation at a low speed, the combustibility within a combustion chamber can be enhanced by supplying a relatively small amount of an air-fuel mixture into the combustion chamber to produce a swirl in the combustion chamber. It is also known that such a condition can be obtained by changing the lift amount of the intake valve. In the valve operating system designed to drive the intake valve by the electromagnetic force, however, it is difficult to change the lift amount of the intake valve and therefore, it is desired that a swirl equivalent to the swirl produced by the changing the lift amount can be produced by a construction as substituted for the construction in which the lift amount is variable.

SUMMARY OF THE INVENTION

Accordingly, it is an object of the present invention to provide a valve operating system designed to open and close the intake valve by an electromagnetic force, wherein a swirl equivalent to the swirl produced by the changing of the lift amount can be produced, and a reduction in consumed electric power and a reliable driving, e.g., a reliable starting can be achieved.

To achieve the above object, according to the present invention, there is provided a valve operating system for an internal combustion engine, comprising: first and second intake valves capable of opening and closing first and second intake valve bores which are provided in a cylinder head to face a combustion chamber; a first electromagnetic driving means for electromagnetically driving said first intake valve; a second electromagnetic driving means for electromagnetically driving said second intake valve with a larger opening and closing stroke than that of said first intake valve; and a control means for controlling the operation of said first and second electromagnetic driving means in a manner that when the engine is in a predetermined operational state, said first intake valve is opened and closed in a condition in which said second intake valve has been closed and stopped. With such construction, only the first intake valve can be opened and closed in the predetermined operational state of the engine such as during starting of the engine to produce a swirl. Moreover, because of a relatively small opening and closing stroke of the first intake valve, the electromagnetic driving force of the first electromagnetic driving means can be set at a relatively small value and thus, it is possible to provide a reduction in size of the first electromagnetic driving means and an electric power-saving, while realizing the reliable opening and closing of the first intake valve.

According to another aspect and feature of the invention, an opening area of said first intake valve bore is set smaller than that of said second intake valve bore. With this arrangement, it is possible; to supply the air-fuel mixture in an amount substantially corresponding to an amount of air required by the engine; to lightening the first intake valve and; and to downsize the first electromagnetic driving means.

According to another aspect and feature of the present invention, each of the first and second electromagnetic driving means comprises an armature operatively connected to corresponding one of the intake valves, a valve-closing electromagnet capable of exhibiting an electromagnetic force for attracting the armature to close the intake valve, a valve-opening electromagnet capable of exhibiting an electromagnetic force for attracting the armature to open the intake valve, a valve-closing return spring for biasing the armature in a direction to close the intake valve, and a valve-opening return spring for biasing the armature in a direction to open the intake valve. Thus, the present invention can be applied to a valve operating system of a type which is designed to drive the intake valve in an ON-OFF manner between an opened position and a closed position and which includes an electromagnetic driving means that is difficult to drive the intake valve at a variable lift, whereby the production of a swirl, a reduction in consumed electric power and a reliable driving can be more reliably realized.

According to a further aspect and feature of the present invention, the second electromagnetic driving means is provided with an equilibrium position changing means which is capable of changing the equilibrium neutral position of the armature retained by the valve-closing and valve-opening return springs in deenergized states of the valve-closing and valve-opening electromagnets. Thus, a reliable operation of the second intake valve with a large opening and closing stroke can be insured.

The above and other objects, features and advantages of the invention will become apparent from the following description of a preferred embodiment taken in conjunction with the accompanying drawings.

DESCRIPTION OF THE PREFERRED EMBODIMENT

The present invention will now be described by way of a preferred embodiment with reference to the accompanying drawings.

Figure 1:
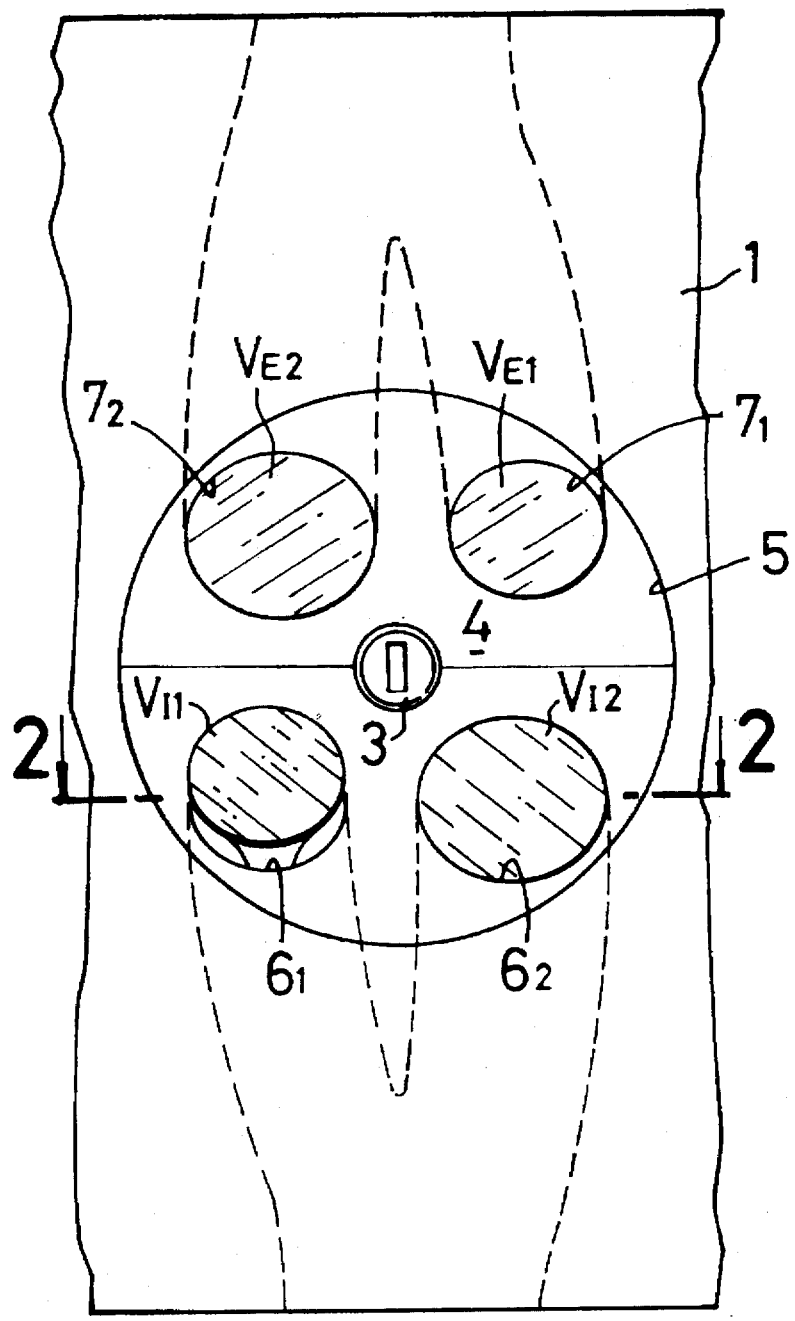
FIG. 1 is a bottom view of a cylinder head.

Referring first to FIG. 1, a recess 5 is provided in a cylinder head 1 to define a combustion chamber 4 between the recess 5 and a piston which is not shown, and a spark plug 3 faces a central portion of the combustion chamber 4. First and second intake valve bores $6_1$ and $6_2$ and first and second exhaust valve bores $7_1$ and $7_2$ are also provided in the cylinder head 1, and open into the combustion chamber 4. The opening area of the first intake valve bore $6_1$ is set smaller than that of the second intake valve bore $6_2$, and the opening area of the first exhaust valve bore $7_1$ is set smaller than that of the second exhaust valve bore $7_2$. The first intake valve bore $6_1$ and the first exhaust valve bore $7_1$ are disposed at symmetrical positions with respect to the spark plug 3, and the second intake valve bore $6_2$ and the second exhaust valve bore $7_2$ are also disposed at symmetrical positions with respect to the spark plug 3.

The first and second intake valve bores $6_1$ and $6_2$ are opened and closed by first and second intake valves $V_{I1}$ and $V_{I2}$, and the first and second exhaust valve bores $7_1$ and $7_2$ are opened and closed by first and second exhaust valves $V_{E1}$ and $V_{E2}$.

Figure 2:
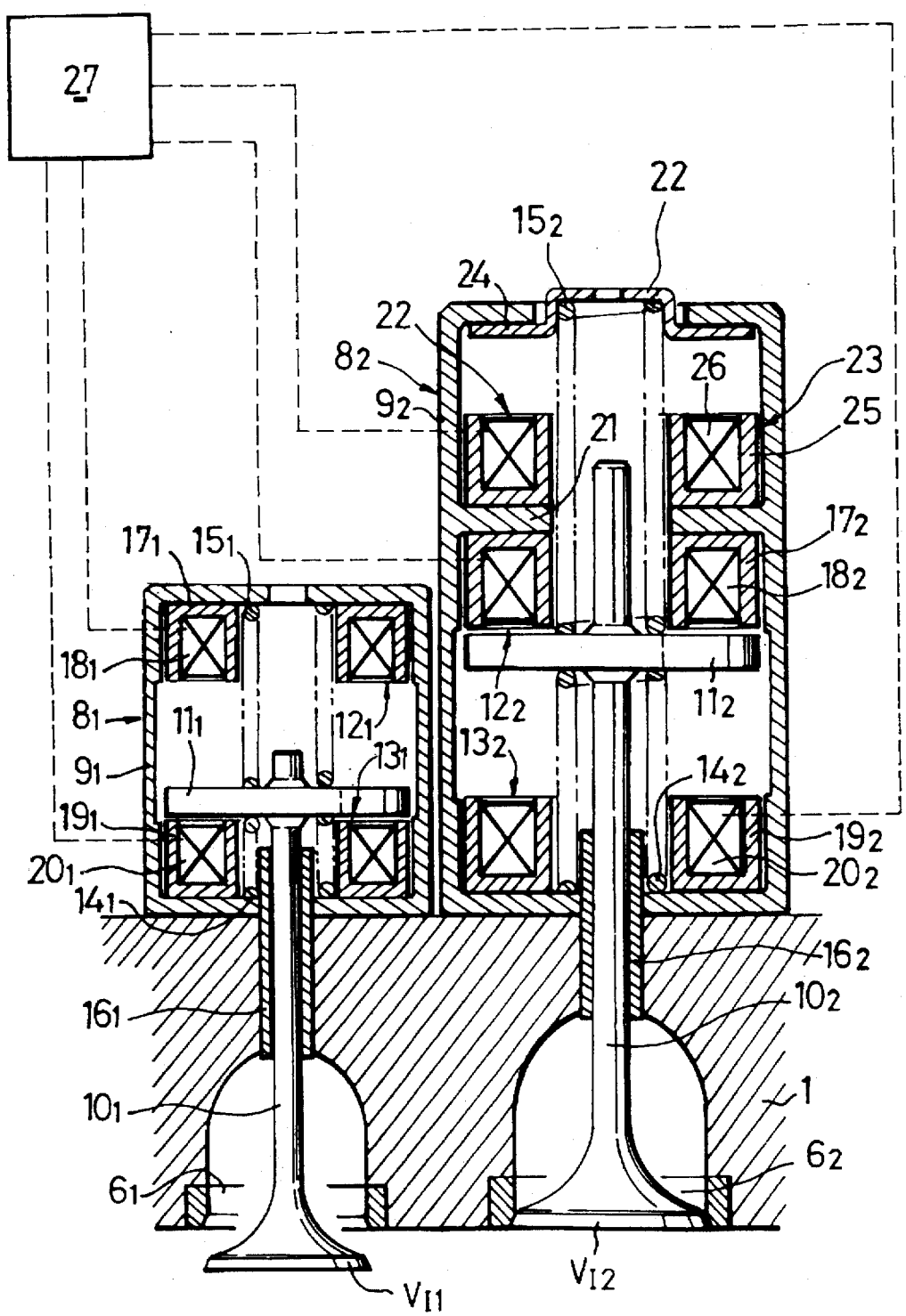
FIG. 2 is a sectional view taken along a line 2—2 in FIG. 1.

Referring also to FIG. 2, the first intake valve $V_{I1}$ is opened and closed by a first electromagnetic driving means $8_1$, and the second intake valve $V_{I2}$ is opened and closed by a second electromagnetic driving means $8_2$ at an opening and closing stroke larger than that of the first intake valve $V_{I1}$.

The first electromagnetic driving means $8_1$ includes a housing $9_1$ made of a non-magnetic material and mounted on the cylinder head 1, an armature $11_1$ integrally provided on a stem $10_1$ of the first intake valve $V_{I1}$ and movably accommodated in the housing $9_1$, a valve-closing electromagnet $12_1$ which is fixedly disposed within the housing $9_1$ at a location opposed to an upper surface of the armature $11_1$ and which is capable of exhibiting an electromagnetic force for attracting the armature $11_1$ to close the first intake valve $V_{I1}$, a valve-opening electromagnet $13_1$ which is fixedly disposed within the housing $9_1$ at a location opposed to a lower surface of the armature $11_1$ and which is capable of exhibiting an electromagnetic force for attracting the armature $11_1$ to open the first intake valve $V_{I1}$, a valve-closing return spring $14_1$ for biasing the armature $11_1$ in a direction to close the first intake valve $V_{I1}$, and a valve-opening return spring $15_1$ for biasing the armature $11_1$ in a direction to open the first intake valve $V_{I1}$.

The housing $9_1$ is formed into a cylindrical shape with opposite ends closed. A guide sleeve $16_1$ is fixedly mounted in the cylinder head 1 to protrude into the housing $9_1$ from the lower end of the housing $9_1$, and the stem $10_1$ of the first intake valve $V_{I1}$ is slidably fitted in the guide sleeve $16_1$. The disk-like armature $11_1$ is integrally, fixedly mounted on a middle portion of the stem $10_1$ protruding out of the guide sleeve $16_1$ within the housing $9_1$.

The valve-closing electromagnet $12_1$ is fixedly disposed in an upper area within the housing $9_1$ in an opposed relation to an upper surface of the armature $11_1$, and includes a coil $18_1$ accommodated in a ring-like stationary core $17_1$ which has a substantially U-shaped cross section with one side opening toward the armature $11_1$ and which coaxially surrounds the stem $10_1$. The valve-opening electromagnet $13_1$ is fixedly disposed in a lower area within the housing $9_1$ in an opposed relation to a lower surface of the armature $11_1$, and includes a coil $20_1$ accommodated in a ring-like stationary core $19_1$ which has a substantially U-shaped cross section with one side opening toward the armature $11_1$ and which coaxially surrounds the stem $10_1$.

The valve-closing return spring $14_1$ is compressed between a lower end of the housing $9_1$ and the armature $11_1$, and the valve-opening return spring $15_1$ is compressed between an upper end of the housing $9_1$ and the armature $11_1$. When both the electromagnets $12_1$ and $13_1$ are in their deenergized states, both the return springs $14_1$ and $15_1$ retain the armature $11_1$ at an equilibrium neutral position halfway between both the electromagnets $12_1$ and $13_1$. In this condition, the first intake valve $V_{I1}$ lies at a central position between its closed and opened positions.

The second electromagnetic driving means $8_2$ includes a housing $9_2$ made of a non-magnetic material and mounted on the cylinder head 1, an armature $11_2$ integrally provided on a stem $10_2$ of the second intake valve $V_{I2}$ and movably accommodated in the housing $9_2$, a valve-closing electromagnet $12_2$ which is fixedly disposed within the housing $9_2$ at a location opposed to an upper surface of the armature $11_2$ and which is capable of exhibiting an electromagnetic force for attracting the armature $11_2$ to close the second intake valve $V_{I2}$, a valve-opening electromagnet $13_2$ which is fixedly disposed in a lower area within the housing $9_2$ at a location opposed to a lower surface of the armature $11_2$ and which is capable of exhibiting an electromagnetic force for attracting the armature $11_2$ to open the second intake valve $V_{I2}$, a valve-closing return spring $14_2$ for biasing the armature $11_2$ in a direction to close the second intake valve $V_{I2}$, and a valve-opening return spring $15_2$ for biasing the armature $11_2$ in a direction to open the second intake valve $V_{I2}$.

The housing $9_2$ is formed into a cylindrical shape with opposite ends closed. A guide sleeve $16_2$ is fixedly mounted in the cylinder head 1 to protrude into the housing $9_2$ from the lower end of the housing $9_2$, and the stem $10_2$ of the second intake valve $V_{I2}$ is slidably fitted in the guide sleeve $16_2$. The disk-like armature $11_2$ is integrally mounted on a middle portion of the stem $10_2$ protruding out of the guide sleeve $16_2$ within the housing $9_2$.

A supporting collar 21 is provided on an inner surface of the housing $9_2$ at its middle portion to protrude radially inwardly. The valve-closing electromagnet $12_2$ is fixedly disposed on the supporting collar 21 within the housing $9_2$ in an opposed relation to an upper surface of the armature $11_1$. The valve-closing electromagnet $12_2$ includes a coil $18_2$ accommodated in a ring-like stationary core $17_2$ which has a substantially U-shaped cross section with one side opening toward the armature $11_2$ and which coaxially surrounds the stem $10_2$. The valve-opening electromagnet $13_2$ is fixedly disposed in a lower area within the housing $9_2$ in an opposed relation to a lower surface of the armature $11_2$. The valve-opening electromagnet $13_2$ includes a coil $20_2$ accommodated in a ring-like stationary core $19_2$ which has a substantially U-shaped cross section with one side opening toward the armature $11_2$ and which coaxially surrounds the stem $10_2$.

The opening/closing stroke of the second intake valve $V_{I2}$ is set larger than that of the first intake valve $V_{I1}$. The distance between the valve-closing electromagnet $12_2$ and the valve-opening electromagnet $13_2$ in the second electromagnetic driving means $8_2$ is set larger than the distance between the valve-closing electromagnet $12_1$ and the valve-opening electromagnet $13_1$ in the first electromagnetic driving means $8_1$.

An equilibrium position changing means 22 is mounted in the second electromagnetic driving means $8_2$ and includes an electromagnet 23 which is fixedly disposed on the supporting collar 21 within the housing $9_2$, and a retainer 24 made of a magnetic material and opposed to the electromagnet 23. The electromagnet 23 includes a coil 26 accommodated in a ring-like stationary core 25 which has a substantially U-shape in cross section with its upper side opening. The retainer 24 is movably accommodated within the housing $9_2$ for movement between an upper limit position defined by an upper end of the housing $9_2$, when the electromagnet 23 is deenergized, and a lower limit position in which the retainer 24 is attracted to the electromagnet 23 in response to the energization of the electromagnet 23.

The valve-closing return spring $14_2$ is compressed between the lower end of the housing $9_2$ and the armature $11_2$, and the valve-opening return spring $15_2$ is compressed between the retainer 24 of the equilibrium position changing means 22 and the armature $11_2$. When the electromagnet 23 of the equilibrium position changing means 22 is in its energized state and the retainer 24 is in its lower limit position, both the return springs $14_2$ and $15_2$ retain the armature $11_2$ at an equilibrium neutral position halfway between both the valve-closing electromagnet $12_2$ and the valve-opening electromagnet $13_2$ in response to the de-energization of the valve-closing electromagnet $12_2$ and the valve-opening electromagnet $13_2$. In this condition, the second intake valve $V_{I2}$ lies substantially halfway between its closed and opened positions. When the electromagnet 23 of the equilibrium position changing means 22 is in its deenergized state and the retainer 24 is in its upper limit position, as shown in FIG. 2, both the return springs $14_2$ and $15_2$ displace the equilibrium neutral position of the armature $11_2$ toward the valve-closing electromagnet $12_2$, so that spring forces of the return springs $14_2$ and $15_2$ are balanced. For example, when the second intake valve $V_{I2}$ is started, or when the attraction of the armature $11_2$ to the valve-closing electromagnet $12_2$ is failed, the equilibrium position changing means 22 ensures that the starting of the engine can be easily performed, or the attraction of the armature $11_2$ to the valve-closing electromagnet $12_2$ can be reliably performed, both by energizing the electromagnet 23.

The energization and deenergization of the valve-closing and valve-opening electromagnets $12_1$ and $13_1$ in the first electromagnetic driving means $8_1$, the valve-closing and valve-opening electromagnets $12_2$ and $13_2$ in the second electromagnetic driving means $8_2$, and the electromagnet 23 of the equilibrium position changing means 22 in the second electromagnetic driving means $8_2$ are controlled by a control means 27. The control means 27 controls the electromagnets $12_1$, $13_1$, $12_2$, $13_2$ and 23 in a switching manner during starting, low-speed operation, medium-speed operation and high-speed operation of the engine.

The first and second exhaust valves $V_{E1}$ and $V_{E2}$ are opened and closed by an electromagnetic driving means of the same construction as that for the first and second intake valves $V_{I1}$ and $V_{I2}$. The opening and closing of the first exhaust valve $V_{E1}$ is controlled in the same mode as for the first intake valve $V_{I1}$, and the opening and closing of the second exhaust valve $V_{E2}$ is controlled in the same mode as for the second intake valve $V_{I2}$.

The control of the operation of the intake valves $V_{I1}$ and $V_{I2}$ and the exhaust valves $V_{E1}$ and $V_{E2}$ during the starting, the low-speed operation, the medium-speed operation and the high-speed operation of the engine will be described below.

(During starting of engine)

Figure 3A:
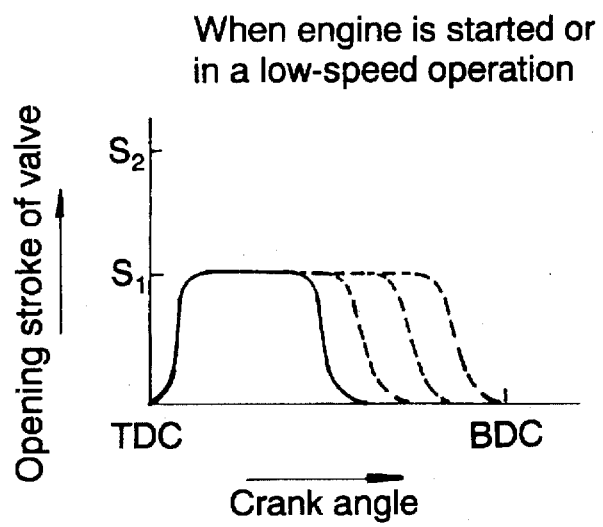
FIGS. 3A to 3C are diagrams illustrating valve-operating characteristics for intake valves in accordance with the operational state of an engine.
Figure 4:
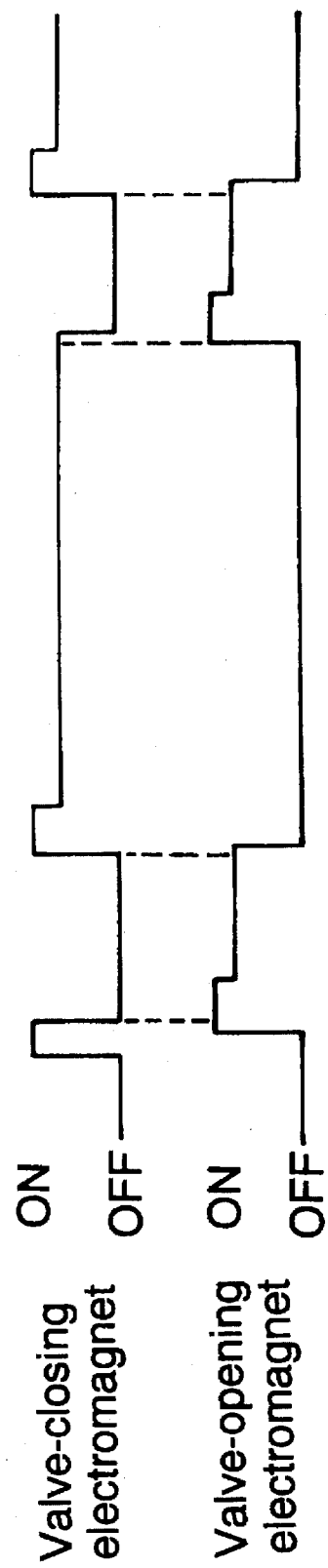
FIG. 4 is a diagram illustrating timings of control of valve-closing and valve-opening electromagnets.

During the starting of the engine, the first intake valve $V_{I1}$ is opened and closed by the first electromagnetic driving means $8_1$ and at the same time, the first exhaust valve $V_{E1}$ is also opened and closed. But the second electromagnetic driving means $8_2$ for driving the second intake valve $V_{I2}$ is in its stopped state, and the second exhaust valve $V_{E2}$ is also in its stopped state. In other words, during the starting of the engine, only the first intake and exhaust valves $V_{I1}$ and $V_{E1}$ are opened and closed. The timing of the energizing and de-energizing of the valve-opening and valve-closing electromagnets $13_1$ and $12_1$ for opening and closing the first intake valve $V_{I1}$ is shown in FIG. 4. The first intake valve $V_{I1}$ is opened and closed with a relatively small opening and closing stroke as shown in FIG. 3A, and the first exhaust valve $V_{E1}$ is also opened and closed with a relatively small opening and closing stroke $S_1$. Moreover, the opening area of each of the first intake and exhaust valve bores $6_1$ and $7_1$ is small. Thus, the first intake valve $V_{I1}$ and the first exhaust valve $V_{E1}$ can be relatively small-sized and lightweight and can be reliably started with a small driving power by the first electromagnetic driving means $8_1$.

With the second electromagnetic driving means $8_2$, in a condition in which the electromagnet 23 of the equilibrium position changing means 22 has been deenergized, the valve-closing electromagnet $12_2$ is energized to attract the armature $11_2$, thereby maintaining the second intake valve $V_{I2}$ in its closed and stopped state. To maintain the closed and opened states of the second intake valve $V_{I2}$ by the valve-closing electromagnet $12_2$ and the valve-opening electromagnet $13_2$ in the second electromagnetic driving means $8_2$, a relatively small electric power need only be required, as compared with that required to open and close the first intake valve $V_{I1}$. Thus, the electric power required in the first and second electromagnetic driving means $8_1$ and $8_2$ is also relatively small.

Moreover, because the opening and closing stroke $S_1$ of the first intake and exhaust valves $V_{I1}$ and $V_{E1}$ is relatively small and the first intake and exhaust valves $V_{I1}$ and $V_{E1}$ are small-sized and lightweight, an equilibrium position changing means similar to the equilibrium position changing means 22 provided in the second electromagnetic driving means $8_2$ is not required in the first electromagnetic driving means $8_1$. This enables a reduction in size of the first electromagnetic driving means $8_1$ and is convenient for a layout when the valve operating system according to the present invention is applied to a 4-valve and multi-cylinder type internal combustion engine.

Further, in a condition in which the second intake and exhaust valves $V_{I2}$ and $V_{E2}$ have been closed and stopped, a swirl can be formed within the combustion chamber 4 by the opening and closing of the first intake and exhaust valves $V_{I1}$ and $V_{E1}$, thereby enhancing the combustibility within the combustion chamber 4.

(During low-speed operation of engine)

As during the starting of the engine, during the low-speed operation of the engine, the first intake valve $V_{I1}$ is opened and closed by the first electromagnetic driving means $8_1$, and the first exhaust valve $V_{E1}$ is also opened and closed, but the second electromagnetic driving means $8_2$ for driving the second intake valve $V_{I2}$ is in its stopped state, and the second exhaust valve $V_{E2}$ is also in its closed and stopped state. Thus, a swirl can be produced within the combustion chamber 4 with an intake flow rate suitable during a low-speed operation by opening and closing of the first intake valve bore $6_1$ having a small diameter by the first intake valve $V_{I1}$ of the relatively small stroke $S_1$, thereby promoting the mixing of an air-fuel mixture, the lean burn by a stratification, and the propagation of flame to enhance the combustion speed.

In this case, it is possible to change the timing of opening and the opened angle of the first intake valve $V_{I1}$ and the timing of opening and the opened angle of the exhaust valve $V_{E2}$, as shown by dashed lines in FIG. 3A, by changing the timing of energization of the valve-closing electromagnet $12_1$ and the valve-opening electromagnet $13_1$ in the first electromagnetic driving means $8_1$. However, there is a limitation on the opened angle of the first intake and exhaust valves $V_{I1}$ and $V_{E1}$ in order to insure a duration of maintaining of the valve-opened state by the valve-opening electromagnet $13_1$, and there is a limitation on the overlap duration for opening of the first intake and exhaust valves $V_{I1}$ and $V_{E1}$ in order to prevent an interference of the valves $V_{I1}$ and $V_{E1}$ with each other and an interference of the valves $V_{I1}$ and $V_{E1}$ with the piston.

(During medium-speed operation of engine)

Figure 3B:
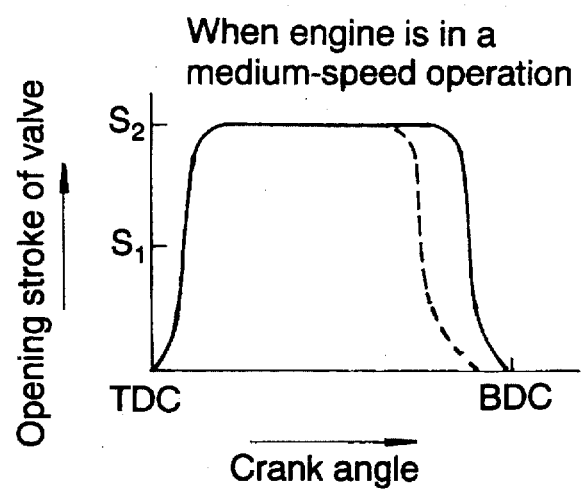

During the medium-speed operation of the engine, the first intake and exhaust valves $V_{I1}$ and $V_{E1}$ are maintained in their closed and stopped states by the first electromagnetic driving means $8_1$, and at the same time, the second intake and exhaust valves $V_{I2}$ and $V_{E2}$ are opened and closed by the second electromagnetic driving means $8_2$. Thus, the second intake valve $V_{I2}$ is opened and closed with a relatively large opening and closing stroke, and the second exhaust valve $V_{E2}$ is also opened and closed with a relatively large opening and closing stroke, as shown in FIG. 3B. In this case, the valve-closing electromagnet $12_1$ in the first electromagnetic driving means $8_1$ remains energized in order to close and stop the first intake and exhaust valves $V_{I1}$ and $V_{E1}$, but unlike during the starting of the engine, a relatively small electric power is consumed in the valve-closing electromagnet $12_1$ to maintain the valve-closed states, leading to a power-saving. In starting the opening and closing of the second intake and exhaust valves $V_{I2}$ and $V_{E2}$, the valve-opening return spring $15_2$ is maintained in its compressed state to accumulate a valve-opening force by energizing the electromagnet 23 of the equilibrium position changing means in a condition in which the valve-closing electromagnet $12_2$ has been energized, and after waiting for a valve-opening timing, the valve-closing electromagnet $12_2$ is deenergized. Thus, the second intake and exhaust valves $V_{I2}$ and $V_{E2}$ are reliably opened. The two-step control of the electromagnets 23 and $12_1$ is carried out when there is a relatively sufficient time, unlike during the starting. This makes it possible to reliably open the second intake and exhaust valves $V_{I2}$ and $V_{E2}$ with a large lift. In this case, when the low-speed operation is shifted to the medium-speed operation, the maintaining of the closed states of the first intake and exhaust valves $V_{I1}$ and $V_{E1}$ and the closing of the second intake and exhaust valves $V_{I2}$ and $V_{E2}$ are synchronized with each other, and the second intake valve $V_{I2}$ is opened at a next intake step, while the second exhaust valve $V_{E2}$ is opened at a next exhaust step.

By such control during the medium-speed operation, it is possible to open and close the second intake valve bore $6_2$ having a large diameter by the second intake valve $V_{I2}$ of a large lift with an increase in amount of air required in the engine, thereby achieving an enhancement in charging efficiency. It is also possible to form a relatively weak swirl within the combustion chamber 4 to perform a stratified combustion in a somewhat lean burn range (e.g., an air-fuel ratio A/F of about 9 to 21). Moreover, in accordance with increases in load and number of revolutions of the engine, the timing of opening and closing of the second intake valve $V_{I2}$ can be controlled as shown by a dashed line in FIG. 3B, and the timing of opening and closing the second exhaust valve $V_{E2}$ can be also controlled. Thus, it is possible to retard the time point of closing/seating of the second intake valve $V_{I2}$ (to increase the opened angle) to insure the charging efficiency. Further, it is possible to provide a power-saving, because only the second intake and exhaust valves $V_{I2}$ and $V_{E2}$ are opened and closed.

(During high-speed operation of engine)

Figure 3C:
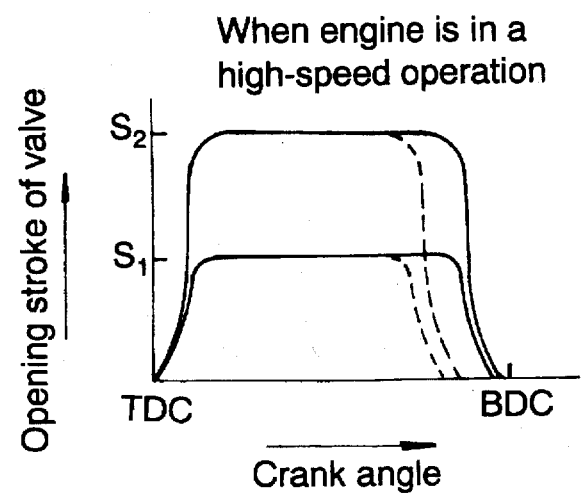

During the high-speed operation, the first intake and exhaust valves $V_{I1}$ and $V_{E1}$ are opened and closed by the first electromagnetic driving means $8_1$ and at the same time, the second intake and exhaust valves $V_{I2}$ and $V_{E2}$ are opened and closed by the second electromagnetic driving means $8_2$. Thus, as shown in FIG. 3C, the first intake valve $V_{I1}$ is opened and closed with a relatively small opening and closing stroke $S_1$ and the first exhaust valve $V_{E1}$ is also opened and closed with a relatively small opening and closing stroke $S_1$ by its electromagnetic driving means. The second intake valve $V_{I2}$ is opened and closed with a relatively large opening and closing stroke $S_2$ and the second exhaust valve $V_{E2}$ is also opened and closed with a relatively large opening and closing stroke $S_2$ by the second electromagnetic driving means $8_2$. Thus, it is possible to enhance the engine output. Moreover, as shown in FIG. 3C by dashed lines in FIG. 3, it is possible to change the timing of opening of the first and second intake valves $V_{I1}$ and $V_{I2}$, if required, and likewise, to change the timing of closing of the first and second exhaust valves $V_{E1}$ and $V_{E2}$, if required.

Although the embodiment of the present invention has been described in detail, it will be understood that the present invention is not limited to the above-described embodiment, and various modifications in design may be made without departing from the spirit and scope of the invention defined in claims.

For example, the present invention is applicable to a valve opening system in which one exhaust valve is provided for every one cylinder. The present invention is also applicable to a valve opening system designed so that the first and second intake valves $V_{I1}$ and $V_{I2}$ are driven by a linear solenoid.

What is claimed is:

1. A valve operating system for an internal combustion engine, comprising:

first and second intake valves capable of opening and closing first and second intake valve bores, respectively, which are provided in a cylinder head to face a combustion chamber;

a first electromagnetic driving means for electromagnetically driving said first intake valve;

a second electromagnetic driving means for electromagnetically driving said second intake valve with a larger opening and closing stroke than that of said first intake valve; and a control means for controlling the operation of said first and second electromagnetic driving means in a manner that when the engine is in predetermined operational states including an engine starting state, said first intake valve is opened and closed in a condition in which said second intake valve has been closed and stopped, wherein said second electromagnetic driving means is provided with an equilibrium position changing means for selectively changing an equilibrium neutral position of said second intake valve.

2. A valve operating system for an internal combustion engine according to claim 1, wherein an opening area of said first intake valve bore is set smaller than that of said second intake valve bore.

3. A valve operating system for an internal combustion engine according to claim 1 or 2, wherein each of said first and second electromagnetic driving means comprises an armature operatively connected to a corresponding one of said intake valves, a valve-closing electromagnet capable of exhibiting an electromagnetic force for attracting said armature to close said intake valve, a valve-opening electromagnet capable of exhibiting an electromagnetic force for attracting said armature to open said intake valve, a valve-closing return spring for biasing said armature in a direction to close said intake valve, and a valve-opening return spring for biasing said armature in a direction to open said intake valve.

4. A valve operating system for an internal combustion engine according to claim 3, wherein said equilibrium position changing means selectively changes an equilibrium neutral position of said armature retained by said valve-closing and valve-opening return springs in deenergized states of said valve-closing and valve-opening electromagnets.

5. A valve operating system for an internal combustion engine, comprising:

first and second engine valves capable of opening and closing first and second engine valve bores, respectively, which are provided in a cylinder head to face a combustion chamber;

a first electromagnetic driving means for electromagnetically driving said first engine valve;

a second electromagnetic driving means for electromagnetically driving said second engine valve with a larger opening and closing stroke than that of said first engine valve; and a control means for controlling the operation of said first and second electromagnetic driving means in a manner that when the engine is in predetermined operational states including an engine starting state, said first and second engine valves are independently operated from each other, wherein said second electromagnetic driving means is provided with an equilibrium position changing means for selectively changing an equilibrium neutral position of said second engine valve.

6. A valve operating system according to claim 5, wherein said control means causes said first engine valve to open and close and said second engine valve to stay closed when the engine is being started and running in a slow speed operation state.

7. A valve operating system according to claim 5 or 6, wherein said control means causes said first engine valve to stay closed and said second engine valve to open and close when the engine is being operated in a medium speed operation state.

8. A valve operating system according to claim 7, wherein an opening area of said first engine valve is smaller than an opening area of said second engine valve.

9. A valve operating system according to claim 7, wherein said control means causes said first and second engine valves to open and close when the engine is being operated in a high speed operation state.

10. A valve operating system according to claim 1 or 5, wherein said equilibrium position changing means is operable to change the equilibrium neutral position from a valve closed position to a partially open valve position.

* * * * *